Feb. 11, 1930.  E. A. WEITZ  1,746,450
ARRANGEMENT FOR RINSING OF BODY HOLLOWS
Filed Sept. 8, 1927
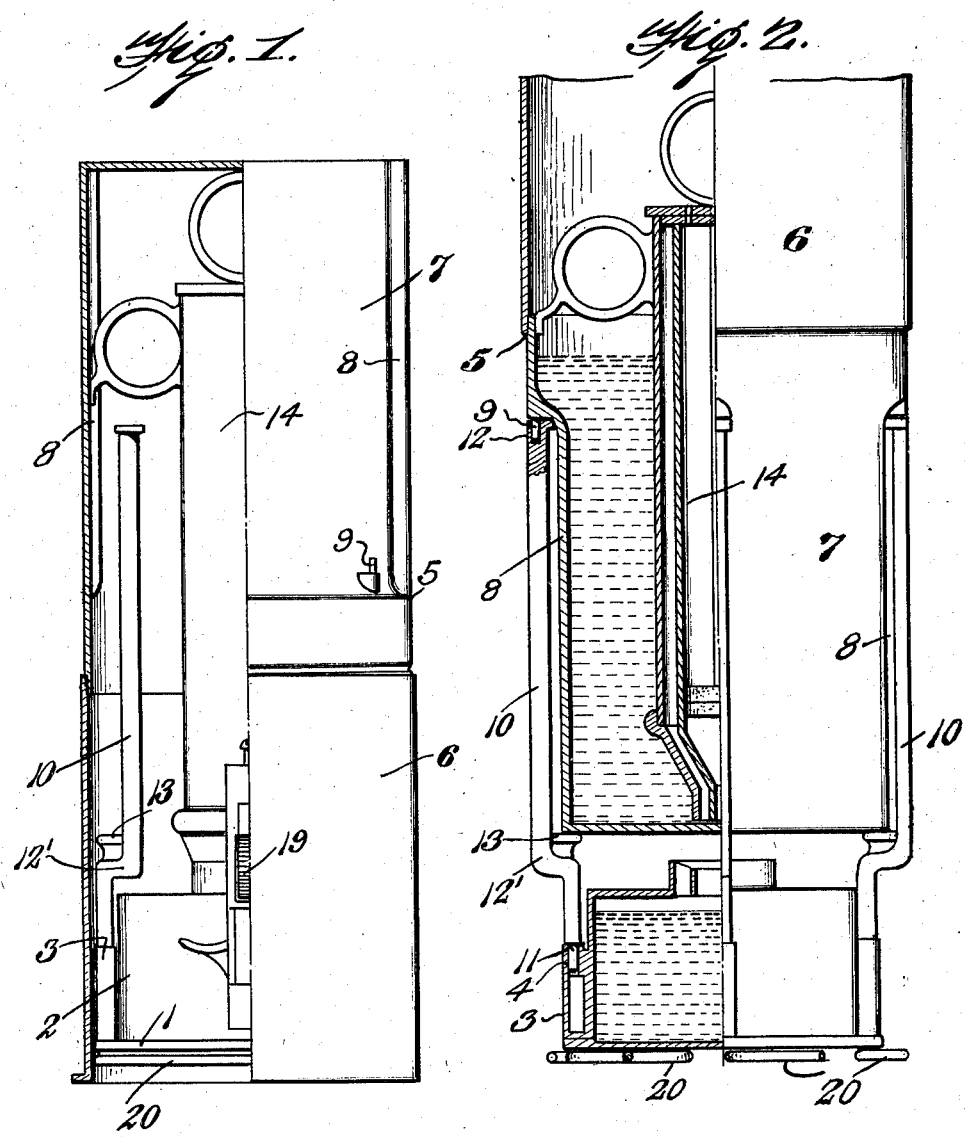
INVENTOR
E. A. WEITZ,
BY Jno Imirie
ATTY.

Patented Feb. 11, 1930

1,746,450

UNITED STATES PATENT OFFICE

EMIL AUGUST WEITZ, OF HAMBURG, GERMANY

ARRANGEMENT FOR RINSING OF BODY HOLLOWS

Application filed September 8, 1927, Serial No. 218,333, and in Germany September 18, 1926.

This invention relates to improvements in a portable syringe apparatus.

The object of the invention is to provide means for convenience in transporting the apparatus and means in the apparatus for warming the liquid employed in a syringe to be subsequently used on a patient.

The invention also comprehends improvements in the details of construction and arrangement of parts which will be hereinafter described and particularly pointed out in the claims.

In the drawings:

Figure 1 is an elevation of the apparatus ready for transporting, parts being shown in section.

Figure 2 is a similar view showing the apparatus in position for warming liquid in a syringe supported in the casing.

1 indicates a base on which is supported a lamp 2, and projecting from the sides of the base are extensions 3 formed at their upper ends with sockets 4.

5 indicates a casing comprising two parts 6 and 7, one fitting in the other. The casing is adapted to enclose the whole structure, when the apparatus is not in use, as shown in Fig. 1. When so employed, the part 6 which is open at the bottom fits over the base and the part 7, which is closed as the top forms a cover. Part 7 of the casing is formed on the outside with vertical grooves 8, and in the bottom of which, as viewed in Fig. 1, are pins 9.

The numeral 10 indicates standards adapted to cooperate with the extensions 3 on the base and the casing when the apparatus is in use. The lower end of each standard is reduced to form a pintle 11, while the upper end is formed with a perforation 12. A slight distance above the lower end of the standard is an offset portion 12', and on the top of same is a support 13.

A syringe 14 is used in connection with the apparatus and is adapted to be supported therein for convenience in transporting and may readily be warmed, as well as the liquid employed in the syringe when the apparatus is in use.

On the bottom of the base are pivoted supports 20, which may be turned outwardly to form an extended base portion when the apparatus is in use, and may be turned inwardly and out of the way when not in use.

When the apparatus is not in use, or is to be transported the end of the syringe 14 is slipped over the burner, the standards are turned on the pintles 11, to throw the offset portions 12' inwardly and over the burner and then the two part casing 5 is slipped over the syringe, standards and base portion and forms a cover for the parts. When the apparatus is to be used, the two part casing is removed and the standards 10 are turned on their pintles to throw the offset portions outwardly. The casing is inverted and the part 7 now becomes the bottom and forms a receptacle for liquid to be heated to be utilized in the syringe. The standards fit in the vertical grooves 8 in the part 7, the bottom of the latter being seated on the supports 13, while the pins 9 fit in the openings 12 in the ends of the standards. It will therefore be obvious that the casing, now the liquid receptacle will be substantially rigidly supported directly over the lamp below.

When the liquid is sufficiently heated the syringe can be forced down into it and can thereby be kept warm to assist in maintaining the liquid warm, which is drawn into the syringe.

The apparatus may be provided with an automatic lighter 19, if desired, to light the lamp when wanted.

Having described my invention what I claim is:

1. In a portable syringe apparatus, the combination of a base, a burner positioned thereon, a plurality of standards swivelly mounted on said base, an invertible cover provided with vertically arranged indented grooves adapted to slide over said standards when said cover is inverted to form a receptacle.

2. In a portable syringe apparatus, the combination of a base, a burner positioned thereon, a plurality of swivelly mounted standards on said base, pivoted supporting extensions on said base, an invertible container and top provided with a plurality of vertically arranged indented grooves adapted to slide over said standards when said cover is inverted to form a receptacle, said standards being adapted to be swung in when the cover is on said base, and a syringe housed in said cover and supported on said burner.

In testimony whereof I affix my signature.

EMIL AUGUST WEITZ.